(12) United States Patent
Merz (10) Patent No.: US 7,484,296 B2
(45) Date of Patent: Feb. 3, 2009

(54) CAMSHAFT AND METHOD FOR PRODUCING A CAMSHAFT OF THIS TYPE

(76) Inventor: Karl Merz, Höhenweg 14, 5734 Reinach (CH)

( * ) Notice: Subject to any disclaimer, the term of this patent is extended or adjusted under 35 U.S.C. 154(b) by 80 days.

(21) Appl. No.: 10/588,484

(22) PCT Filed: Feb. 1, 2005

(86) PCT No.: PCT/CH2005/000050

§ 371 (c)(1),
(2), (4) Date: Aug. 4, 2006

(87) PCT Pub. No.: WO2005/075143

PCT Pub. Date: Aug. 18, 2005

(65) Prior Publication Data

US 2007/0256654 A1    Nov. 8, 2007

(30) Foreign Application Priority Data

Feb. 6, 2004    (CH) ................................ 0182/04

(51) Int. Cl.
*B21D 53/84*    (2006.01)

(52) U.S. Cl. ............... 29/888.1; 123/90.6; 74/567
(58) Field of Classification Search ............ 29/888.1; 123/90.6; 74/567
See application file for complete search history.

(56) References Cited

U.S. PATENT DOCUMENTS

| 4,233,832 A | * | 11/1980 | Rowell ................. 72/91 |
| 4,969,262 A | * | 11/1990 | Hiraoka et al. ......... 29/888.1 |
| 5,598,631 A | | 2/1997 | Umezawa et al. |
| 6,182,361 B1 | | 2/2001 | Cox et al. |

FOREIGN PATENT DOCUMENTS

WO    WO 01/98020    * 12/2001

* cited by examiner

*Primary Examiner*—Zelalem Eshete
(74) *Attorney, Agent, or Firm*—Sughrue Mion, PLLC (57) ABSTRACT

The invention relates to a camshaft (50) comprising a shaft (13) onto which one or more annular cams (46') are pushed and fixed in a positive and/or non-positive fit. To produce said camshaft in a particularly cost-effective, simple and flexible manner, the cams (46') are produced from one or more strip sections by deformation, in particular by bending into an annular form and by the welding of the free ends.

19 Claims, 10 Drawing Sheets

CAMSHAFT AND METHOD FOR PRODUCING A CAMSHAFT OF THIS TYPE

TECHNICAL FIELD

The present invention relates to the field of built-up camshafts. It relates to a camshaft according to the preamble to Claim 1 and to a method for producing a camshaft of this type according to the preamble to Claim 15.

PRIOR ART

Built-up camshafts, unlike forged camshafts, are produced by the cams first being produced as separate components and being subsequently fastened on a suitable shaft at predefined space intervals and with predefined orientation. Both the production of the cams and their fastening on the normally tubular shaft can be realized in a variety of ways.

From WO-A1-03/012262, it is known to create cams by producing a drawn tubular profile, which is then respectively cut to cam width. The cams produced in this way are then slid in the axial direction onto a normally hollow, tubular shaft and fastened on the shaft. This can be done by a variety of joining methods, e.g. laser welding, widening of the hollow shaft by internal high-pressure forming (IHPF) or by non-positive and positive axial sliding onto a region of the shaft whose external diameter is greater than the internal diameter of the cam. The non-positive and positive connection can here be improved by elevations or depressions in the base circle region of the cam (FIG. 6 of WO-A1-03/012262). In this type of cam production, the non-circular cam profile creates, in the region of the elevation of the cam, a cavity between shaft and cam inner side, which cavity can adversely affect the mechanical stability of the cam. In WO-A1-03/012262, it has therefore been proposed (FIG. 4), for mechanical support, to place a plug in this cavity or to close off the cavity by covers welded on at the sides. In addition, the enclosure (the angle of enclosure) between cam and shaft can be increased by suitable variation of the wall thickness in the section of tubing used as the cam (FIG. 3). In this solution, however, the production of the cam is laborious and inflexible in nature: since the base material already exists in tubular form, a machining of the tube inner side to create elevations or the like, or a local alteration of the wall thickness of the tube wall, by forming methods, to change the angle of enclosure, entails considerable difficulties. For economic reasons, moreover, tubes of several meters length, and thus a large number of cams, must be worked simultaneously, with the result that the production is less flexible. Finally, with the tubular base material, it is substantially more laborious to produce and use a material consisting of a plurality of (for example, easily hardenable and easily weldable) layers to optimize the mechanical properties of the camshaft.

From WO-A1-03/008842, a method for producing a camshaft is known in which the cams are formed from at least one cup-like sheet-metal part having a base. In the base, a receiving opening for a tubular shaft is provided. The cam is fastened on the shaft by means of a sleeve, which is slid onto the shaft and reaches through the receiving opening in the cam and acts as a connecting member between shaft and cam. The sleeve is connected both to the cam and to the shaft in a positive, non-positive and integral manner. The production of the cam is simple and flexible. The fastening of the cam on the shaft is relatively laborious and complicated, however, owing to the interposed sleeve.

From DE-C1-101 50 093, a method for producing camshafts is known in which the cam rings are first functionally produced in a separate process and are then non-positively and positively connected to a hollow shaft by an IHPF process. The cams are constructed in two layers and consist of two rings of different material, which are non-positively and positively connected to one another. The inner ring, which consists of a soft, plastically deformable material, can here be made thicker in the region of the elevation of the cam. In this solution, similar drawbacks are present to those in the above-mentioned WO-A1-03/012262.

From U.S. Pat. No. 4,774,852, a camshaft is known in which a (for example, sintered) cam consisting of solid material and having a circular through-hole is fastened on a hollow shaft by means of an axially slotted intermediate ring. This type of cam fastening has not become established in practice. Other types of fastening of forged or sintered cams on hollow shafts achieve a positive and non-positive connection between the cams and the shaft by the creation of an enlarged external diameter on sections of the shaft by forming operations (for example, rolling-on of a zero-pitch thread). The prefabricated cam, the through-hole of which, at least in part, has a smaller diameter, is then slid axially onto the shaft section of enlarged external diameter, whereupon the shaft undergoes deformations. Examples of fastening methods of this type are known from U.S. Pat. No. 5,598,631, EP-B1-0 291 902, U.S. Pat. No. 5,307,708 or U.S. Pat. No. 6,502,538. A drawback with these is the laborious process for producing the individual cams.

Finally, from WO-A1-01/98020 of the applicant, it is known to produce cams for a built-up camshaft from straight, elongated profile strips by appropriate bending of the profile strips and welding together of the free ends, and to slide the cams produced in this way onto a hollow shaft and connect them integrally thereto by means of laser welding or resistance welding. In this context, it has also been proposed by the applicant (WO-A1-02/100588) to produce the cams themselves from at least two different materials, which are optimized for the respective purpose of use (rocker run-down face, weld joint). The production of the cams from single-layered or multilayered profile strips by appropriate bending and welding together of the free ends constitutes a simple, neat, flexible, material-saving and cost-saving production method, which helps considerably to lessen the weight and reduce the cost of built-up camshafts. In addition, cam profiles and cam assemblies with different running surfaces following closely one upon the other can also be realized with this method. The welding of the bent and welded-together cams to the hollow shaft requires, however, a comparatively high complexity of equipment and places high demands upon the process control system.

REPRESENTATION OF THE INVENTION

The object of the invention is therefore to define a camshaft and a method for its production which combine the advantages of cams produced from profile strips with a simplified fastening method.

The object is achieved by virtue of the whole of the features of claims 1 and 15. The core of the invention consists in producing a built-up camshaft by connecting individual cams, which respectively have been produced from one or more profile strips by ring-shaped forming, in particular bending, and welding together of the free ends, positively and/or non-positively to the shaft by axial sliding onto a shaft. It should here be borne in mind that the cams, owing the nature of the production from a profile strip, generally have on the shaft an angle of enclosure which is significantly less than 360°. Hence, not only is less peripheral surface area generally available for the positive and/or non-positive connection to the shaft, but in the region of the elevation of the cam a cavity also exists between the inner wall of the cam and the shaft, so that the cam is mechanically less stable in this region. According to the nature and magnitude of the forces acting on the cam, additional measures must therefore be provided to prevent the cam from being undesirably deformed or even damaged during operation.

According to a preferred embodiment of the invention, the shaft is of tubular configuration. This not only gives rise to material savings, but also significantly reduces the weight and moment of inertia of the finished camshaft.

Another preferred embodiment of the invention is characterized in that the shaft, in the sections in which the cams are placed, has an enlarged external diameter, circumferential beads being incorporated in the shaft, especially in the sections having the enlarged external diameter. As a result of these measures, a secure fastening of the cams is achieved by simple means.

In connection with the enlargement of the external diameter, a rotationally secure seat for the cams, with particularly high load-bearing capacity, is achieved by the fact that the cams have on the inner side of the ring means for creating a positive connection to the shaft, which means comprise, in particular, projections or ribs which protrude radially inward. As the cams are slid onto the shaft, these projections or ribs entrench themselves in regions with enlarged external diameter and thus produce a particularly effective positive connection.

The free ends of the cams are preferably welded together by means of resistance welding. The beads around the weld seam which are formed in the resistance welding must be removed, at least on the outer side, by reworking. On the inner side of the cams, the beads can be used as means for establishing a positive connection. Should this not happen, the beads can be neutralized by the cams having a recess in the region of the weld seam on the inner side of the ring, which recess receives the bead formed during the welding.

A further preferred embodiment of the inventive camshaft is characterized in that the cams are produced in such a way from a profile strip of thickness which varies over the strip length that the cams enclose the shaft with an angle of enclosure which is greater than the angle of enclosure which is predefined by the cam profile if the strip thickness is constant, and in particular measures 360°. In this case, the profile strip can have two shoulders disposed symmetrically to a center plane or can have in the middle a thickening. The enlargement of the angle of enclosure produces an improved positive and/or non-positive connection between the cams and the shaft.

Another preferred embodiment of the camshaft according to the invention is distinguished by the fact that the cams are produced from a profile strip of constant thickness, and that, on the inner side of the ring of the cam, the angle of enclosure (UW) is enlarged by a forming process, in particular is brought to 360°. This is effected, in particular, by the cams, on the inner side of the ring in the region of the elevation, being provided with an indentation.

In order, finally, to adapt the cams as well as possible to the respective conditions, it can be advantageous if the cams are produced from a profile strip which has two layers of different material lying one above the other.

A preferred embodiment of the method according to the invention is distinguished by the fact that the shaft is first enlarged in terms of the external diameter in a section which is earmarked for the seat of a cam, and that the associated cam is subsequently slid onto this section of the shaft. In particular, for the enlargement of the external diameter, circumferential beads are here created on the shaft by a rolling operation.

It is particularly advantageous with respect to the cam fastening if, when the profile strips are transformed into the cams by an additional forming step, in particular by the impression of an indentation, material is transported outward in the axial direction in the region of the elevation of the cam and is heaped up there in such a way that the finished cam encloses the shaft with an angle of enclosure of 360°. The additional forming step is preferably performed after the elevation of the cam has been configured by forming methods.

Further embodiments derive from the dependent claims.

BRIEF EXPLANATION OF THE FIGURES

The invention shall be explained in greater detail below with reference to illustrative embodiments in connection with the drawing, in which.

WAYS OF REALIZING THE INVENTION

Figures 1, 2, 3:
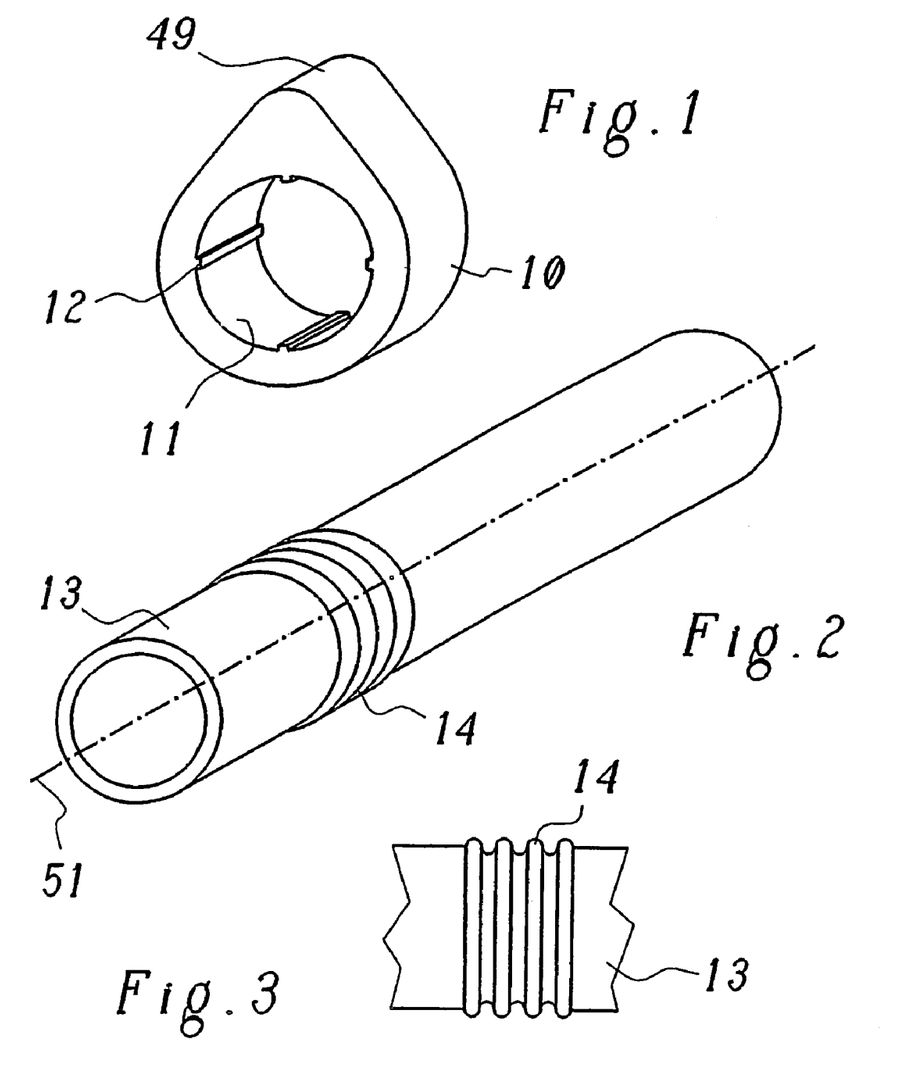
FIG. 1 shows in a perspective representation of a sintered or forged cam according to the prior art.
FIG. 2 shows in a perspective representation a shaft from the prior art in the form of a tube, having a region, enlarged in terms of the external diameter, for receiving cams of the type represented in FIG. 1.
FIG. 3 shows in side view the regions of the shaft from FIG. 2 which is enlarged in terms of the external diameter by rolled-on beads.
Figure 4:
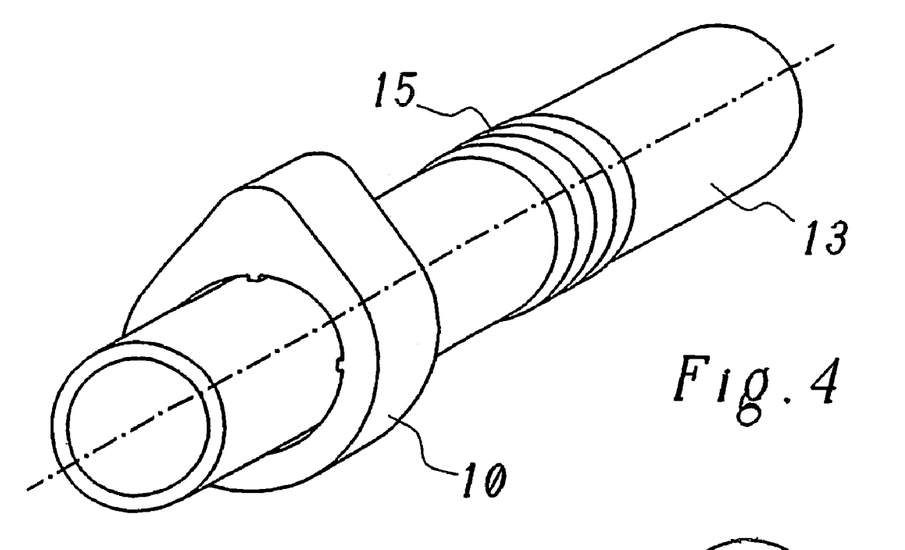
FIG. 4 shows the shaft from FIG. 2 with a first slid-on cam according to FIG. 1.
Figure 5:
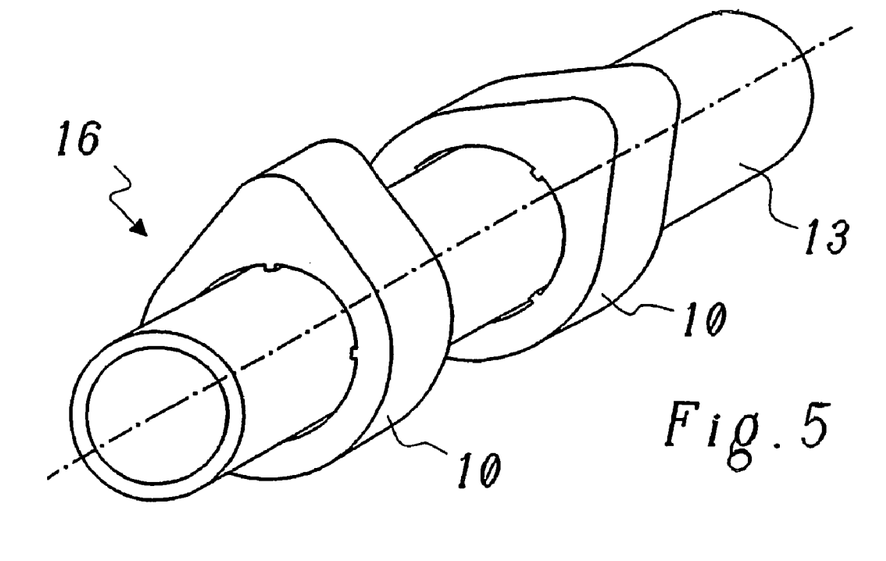
FIG. 5 shows the shaft from FIG. 3 with a second slid-on cam according to FIG. 1, which forms a camshaft with slid-on cams according to the prior art.

In FIG. 1-5 are reproduced various steps of a method for producing a built-up camshaft, as such method is known from the prior art, for example from publication U.S. Pat. No. 4,947,547. First, cams 10 of the type represented in FIG. 1 are produced by a powder-metallurgy process (sintering). They can also, however, be cast or forged. The annular cams 10 have a circular opening 11, through which a shaft 13 according to FIG. 2 can be placed. The control function of the cam 10 is realized by a unilateral elevation 49, which, when the outer run-down face is descended down by a control element, for example a rocker, results in a lifting of the control element. On the inner side of the ring, i.e. on the limit face of the opening 11, there are disposed, distributed over the periphery, a plurality of projections or ribs 12 extending in the axial direction, which have a substantial importance for the positive connection between cam 10 and shaft 13. The cam 10 is made of solid material, i.e. there are no cavities between the outer run-down face and the circular opening 11. If the cam 10 is seated on the shaft 13, it fully encloses the shaft 13. The angle of enclosure measures 360°. Accordingly, the entire limit face of the opening 11 is available for the non-positive and/or positive connection to the shaft 13.

For weight-saving and material-saving purposes, the shaft 13 shown in FIG. 2 is preferably configured as a hollow shaft, which extends along an axis 51. A solid shaft, however, is also conceivable. In order to fasten the cam 10 non-positively and positively on the shaft, the external diameter of the shaft 13 is first locally enlarged, by a forming process, on a section of the shaft 13 which is assigned to the subsequent position of the cam. For this purpose, a zero-pitch thread is preferably rolled onto the shaft 13, which zero-pitch thread is distinguished by a plurality of parallel circumferential beads 14 (FIG. 3). Threads with finite pitch are likewise conceivable. Other possible types of local diametrical enlargement are described in U.S. Pat. No. 5,598,631. The enlarged external diameter is approximately equal to the internal diameter of the opening 11 in the cam 10. The height of the projections 12 is chosen such that the distance measured between opposite projections is somewhat greater than the unchanged external diameter of the shaft.

The cam 10 is then slid in the axial direction onto the shaft 13 which has been prepared in this way. If the cam 10 reaches the section with the local diametrical enlargement, the projections 12 cut into the beads 14 of the zero-pitch thread and thus establish a positive connection between shaft 13 and cam 10. Once the one cam 10 is fastened on the shaft 13 in the described manner, for the next cam (10' in FIG. 5) a further shaft section is provided with beads 15 (FIG. 4) and is thus enlarged in terms of the external diameter. The next cam 10' is then slid onto this section and fastened, according to FIG. 5. This process is repeated step by step until the desired number of cams are fastened in the desired orientation on the shaft 13.

The camshaft 16 which is built up in this way can then be reworked for its definitive use (straightened, smoothed, etc.).

Figure 6:
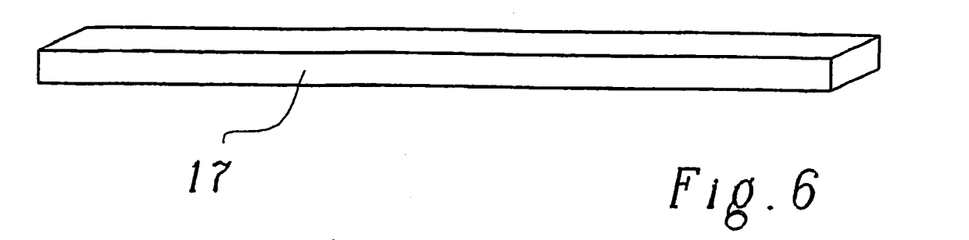
FIG. 6 shows in side view a profile strip which forms the starting point for the production, which is known per se, of a welded cam produced by bending and stamping methods.
Figure 15:
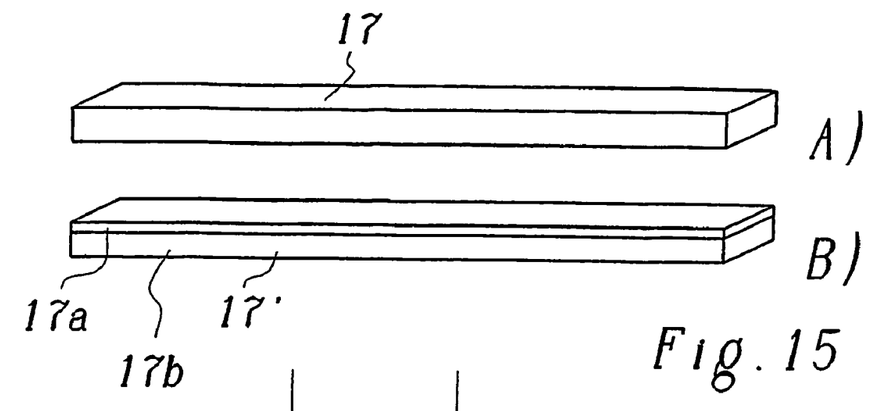
FIG. 15 shows two profile strips made of a unitary material (FIG. 15A) and a double-layered material (FIG. 15B) for the production of a cam by stamping, bending and welding.
Figure 16:
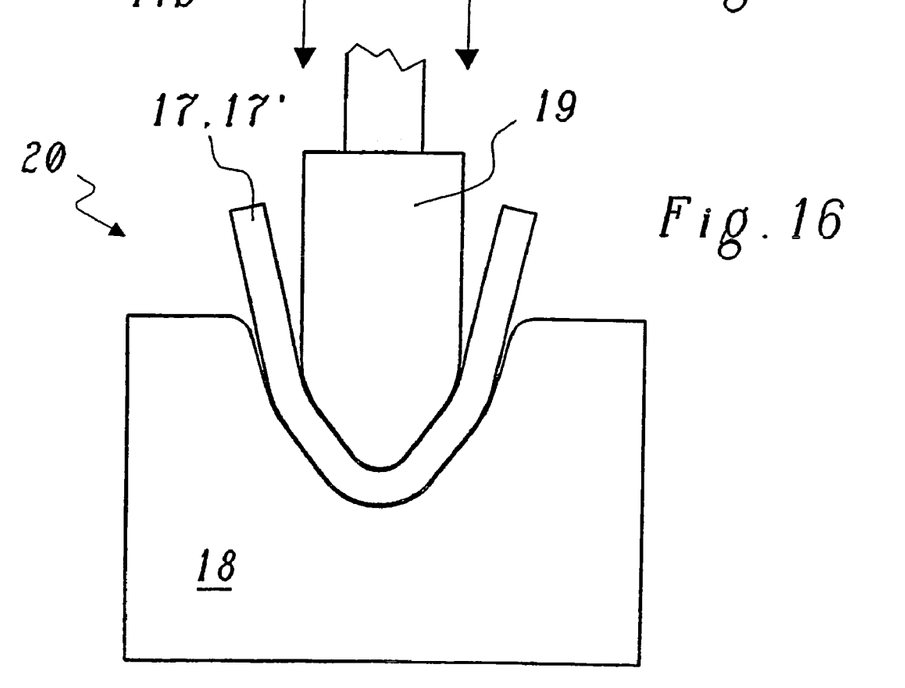
FIG. 16 shows the forming operation, identical to FIG. 7, in the first forming apparatus.

As already mentioned in the introduction, it is known from WO-A1-01/98020 to produce cams for built-up camshafts from a profile strip by bending and welding. The basic steps for this are reproduced diagrammatically in FIG. 6-9. The starting point for the cam production is a profile strip 17 of substantially rectangular cross section of the type represented in FIG. 6. The profile strip 17 can consist of a single material, for example a surface-hardenable steel. It can also, however, be multilayered in order to optimize the properties (see FIG. 15B). If the profile strip consists of a single material, it is particularly cost-effective to create it by forming methods, in particular by rolling methods, from a round wire, since wire-shaped material is generally on offer at the lowest price.

Figure 7:
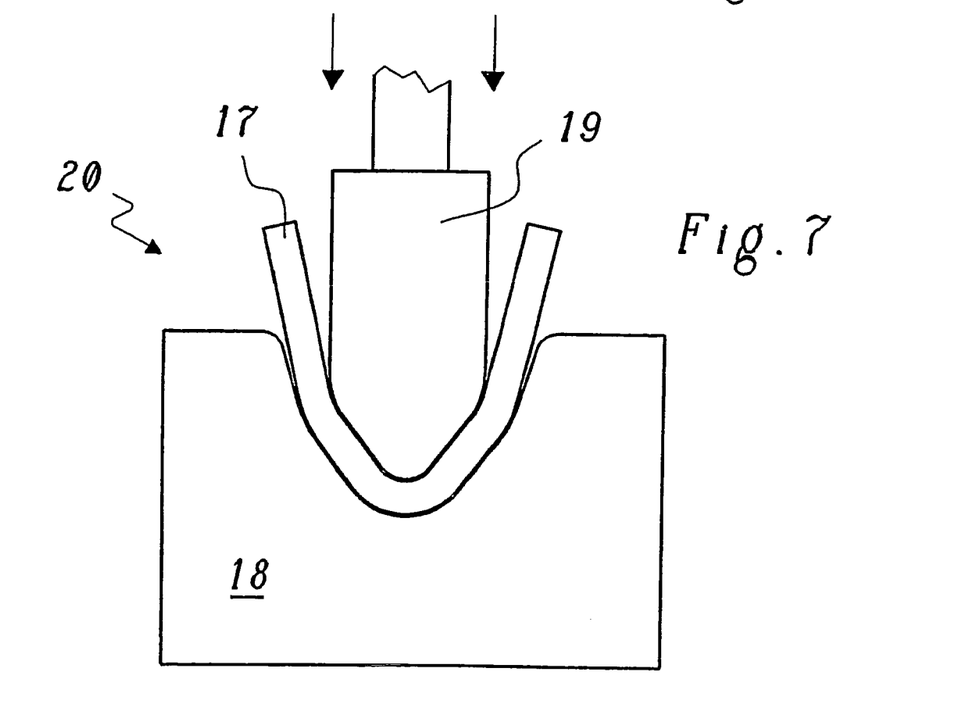
FIG. 7 shows a first forming apparatus, in which, in a first forming operation, the cam profile is incorporated into the profile strip.
Figure 8:
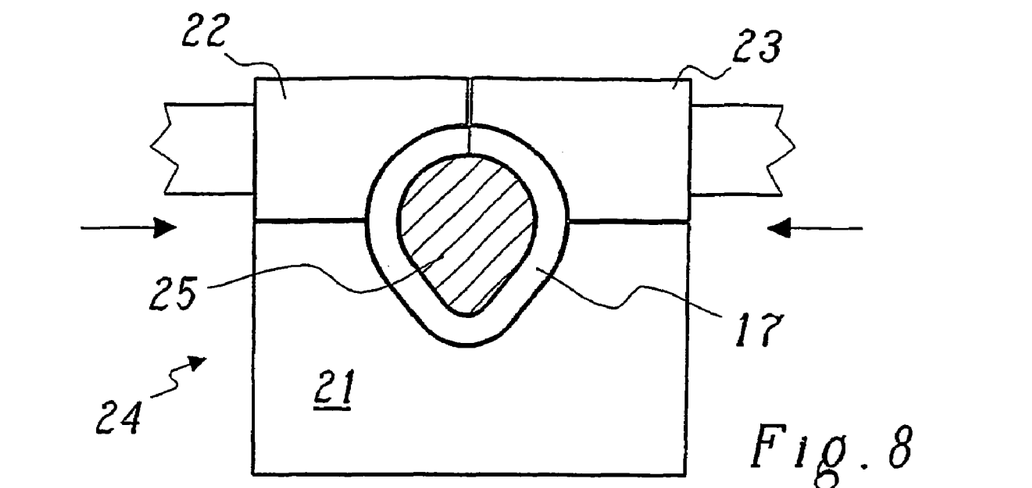
FIG. 8 shows a second forming apparatus, in which the free ends of the profile strip stamped according to FIG. 7 are bent into a closed ring.
Figure 9:
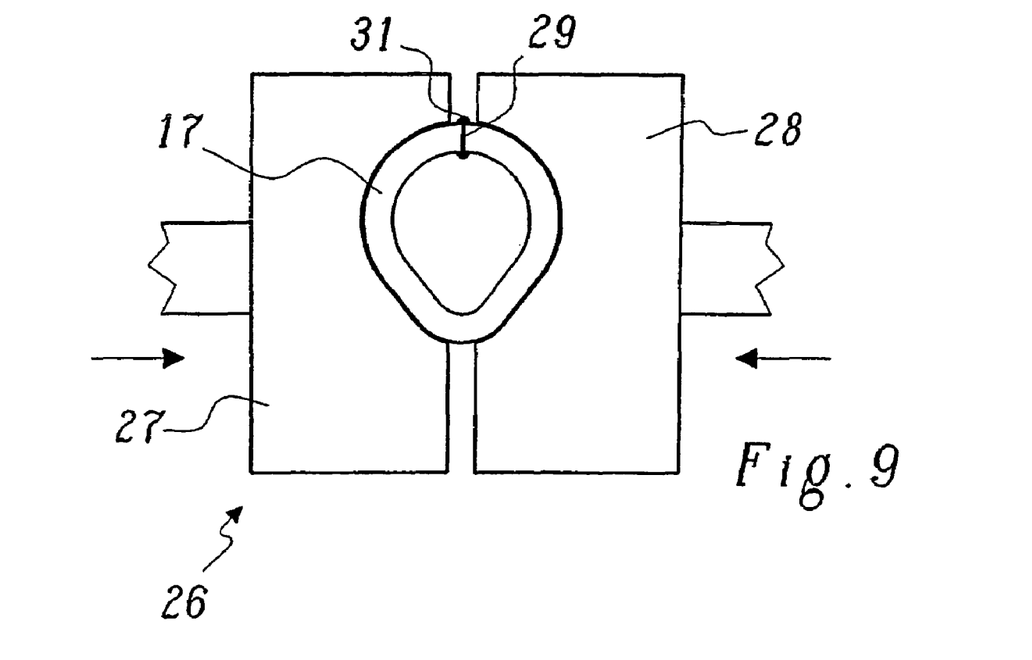
FIG. 9 shows a welding apparatus in which the unconnected ends of the bent ring from FIG. 8 are welded together by means of resistance welding.

In a first forming step, the straight profile strip 17 is formed by bending, according to FIG. 7, in a first forming apparatus 20, which essentially consists of a mold 18 and a forming tool 19. The later elevation of the cam is hereupon configured. The V-shaped intermediate product is then subjected in a second forming apparatus 24 according to FIG. 8, which essentially consists of a mounting 21, a mandrel or bending core 25 and two forming tools 22, 23, to a second forming or bending process. The arms of the V-shaped intermediate product are here bent by means of the forming tools 22, 23 in such a way around the mandrel 25 that the free ends butt one against the other with the end faces and a closed ring is formed. The closed ring is then welded at the butt joint. For this purpose, the ring is inserted, for example, into a welding apparatus 26 according to FIG. 9 and is welded together by resistance welding by means of the two electrodes or pressure dies 27, 28 which are moved with pressure one up to the other. In the resistance welding, a bead 31 is formed around the weld seam 29, which bead necessitates a reworking of the weld.

Figure 10:
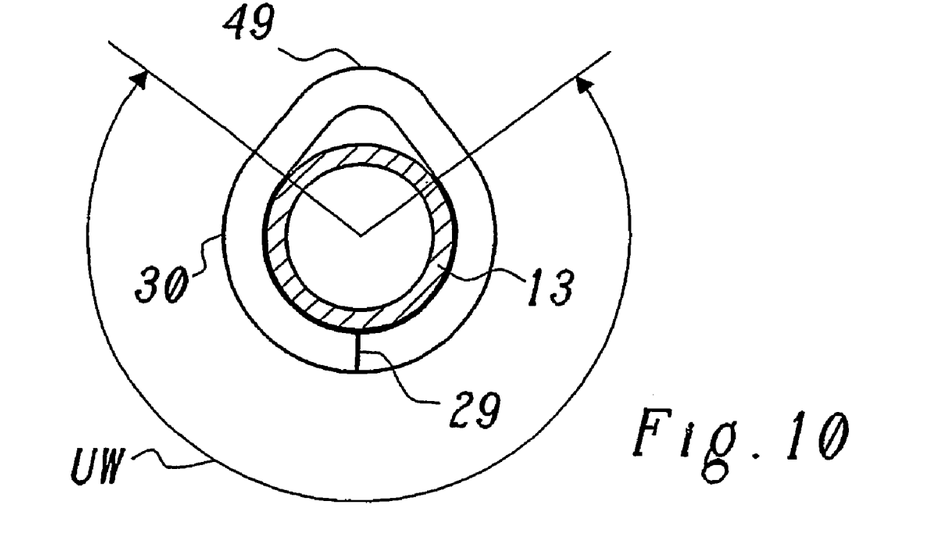
FIG. 10 shows the enclosure of the shaft by a cam produced according to FIG. 6-9.
Figure 11:
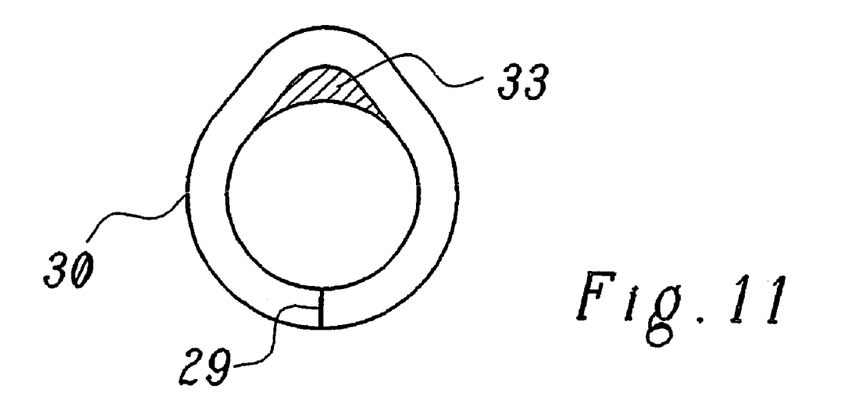
FIG. 11 shows the supplementary area necessary for a complete enclosure.
Figure 12:
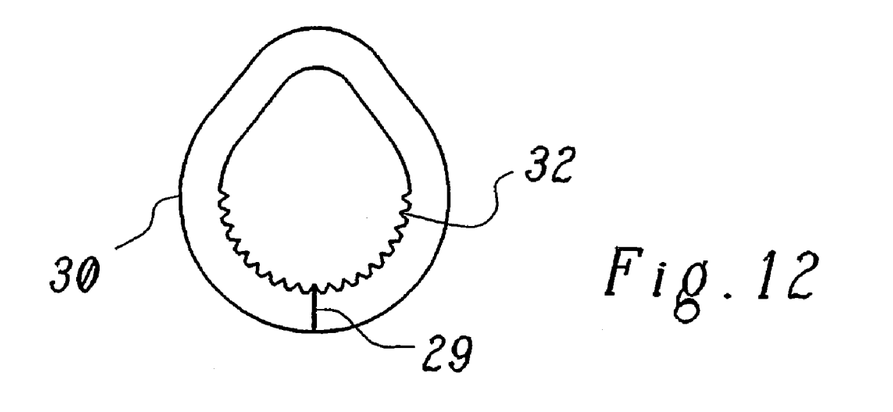
FIG. 12 shows a cam, produced according to FIG. 6-9, with axial ribs for improving the rotationally secure fastening of the cam on the shaft.

If a cam 30 according to FIG. 10 which is produced in this way is connected, by axial sliding onto a shaft 13, non-positively and/or positively to said shaft, a cavity 33 is formed beneath the elevation 49 of the cam 30 (FIG. 11). The angle of enclosure UW (FIG. 10) then measures significantly less than 360°. Accordingly, only a part of the ring inner face of the cam 30 is involved in the non-positive and/or positive connection to the shaft 13. In order to improve the non-positive and positive connection and, in spite of the diminished area, to obtain a good strong connection between cam 30 and shaft 13, on the inner side of the ring additional means, e.g. projections disposed distributed over the periphery (comparable to the projections 12 in FIG. 1) or ribs 32 (FIG. 12), are provided. These means can be created by forming methods on the inner side of the ring, through suitable measures when the profile strips are transformed into the cams. This cannot, however, affect the deformability of the cam 30 in the region of the cavity.

Figure 13:
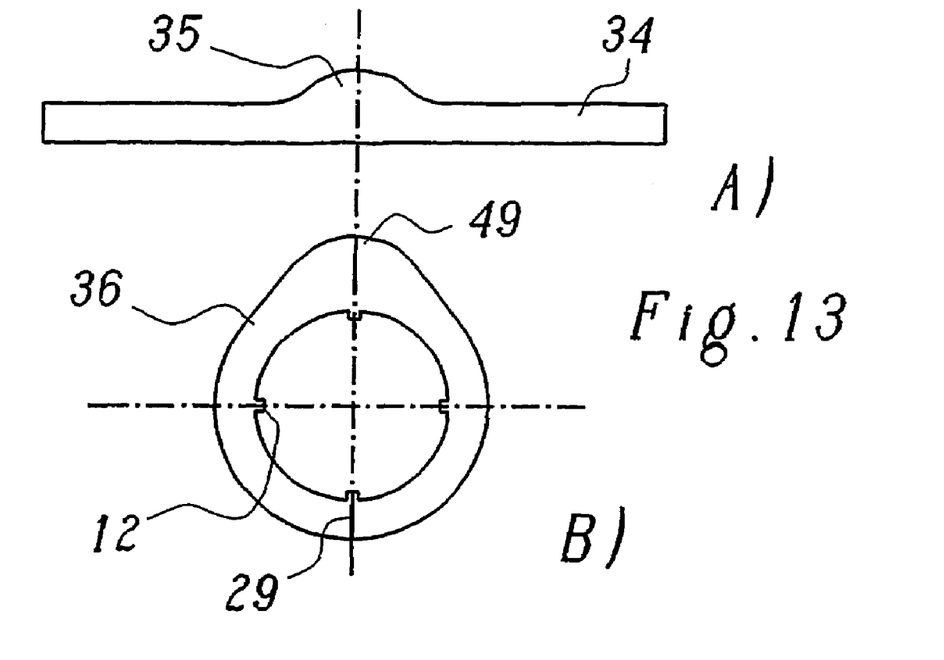
FIG. 13 shows a specially shaped profile strip (FIG. 13A) and the cam formed therefrom according to FIG. 6-9, with supplementary area (FIG. 13B)
Figure 14:
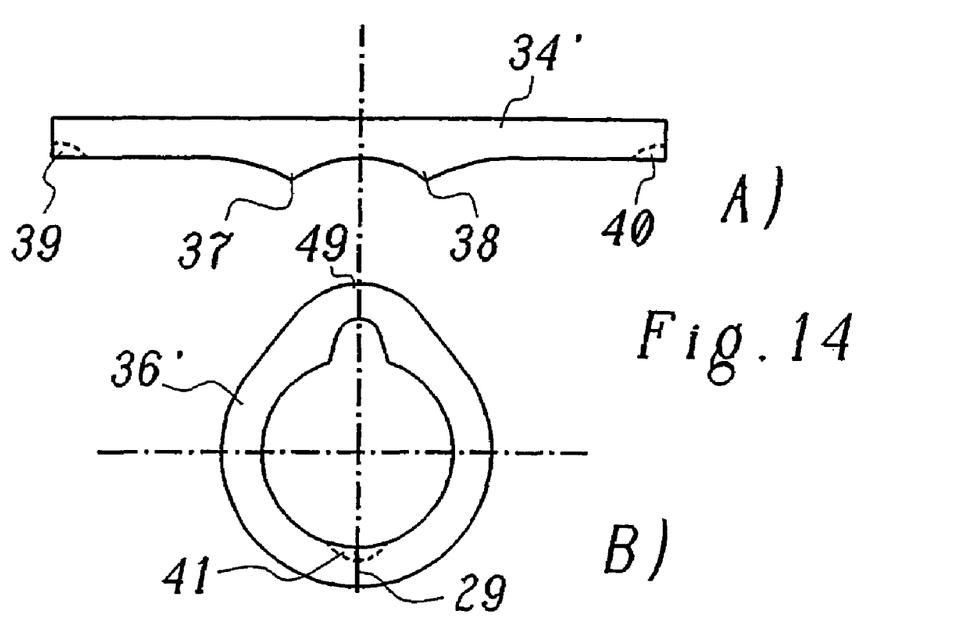
FIG. 14 shows a specially shaped profile strip (FIG. 14A) and the cam formed therefrom according to FIG. 6-9, with diminished supplementary area (FIG. 13B)

A further possibility for improving the non-positive and/or positive connection between the shaft and the slid-on cam consists in increasing the angle of enclosure UW by suitable shaping of the profile strip with a varying strip thickness or even in bringing it to a full 360°. Two examples of such shapings are represented in FIGS. 13 and 14. In FIG. 13, from a profile strip 34 (FIG. 13A) which has in the middle a thickening 35 symmetrical to the center line, a cam 36 (FIG. 13B) is created by bending and welding, which cam has no cavity between the elevation 49 and the shaft and has an angle of enclosure of a full 360°. The cam 36 thus has broadly the same mechanical and strength characteristics as the traditional cam 10 from FIG. 1. The positive and non-positive connection to the shaft is also comparable with the cam 10 from FIG. 1. The projections 12 on the inner side of the ring also act in a corresponding manner.

In FIG. 14, from a profile strip 34' (FIG. 14A) which has in the middle two shoulders 37, 38 disposed symmetrically to the center line, a cam 36' (FIG. 14B) is created, whose cavity is diminished in relation to the cam 30 from FIG. 10 and whose angle of enclosure is enlarged. In this cam 36' too, of course, additional means for improving the non-positive and positive connection can be provided on the inner side of the ring. In addition, on the profile strip 34' at the ends, recesses 39, 40 (drawn in dashed representation in FIG. 14) can be provided, which, in the finished cam 36', add to a recess 41 in the region of the weld seam 29. As a result of this recess 41, space is created for the beads (31 in FIG. 9) which are formed on the inner side of the ring during the resistance welding. A (laborious) reworking of the weld seam on the inner side of the ring can thereby be relinquished.

Particularly advantageous is a method for producing a built-up camshaft, in which a cam is created from a flat profile strip of constant thickness by bending and subsequent welding, which cam has an angle of enclosure of 360°. The full angle of enclosure is here achieved by an additional, interposed forming process, in which cam material is displaced from the region beneath the elevation and forced axially outward in order there to fill the cavity between cam and shaft and boost the angle of enclosure to 360°. The individual steps of the method are reproduced in FIGS. 15-23. According to FIG. 15, the process starts from flat profile strips 17 and 17' of constant thickness. The profile strips can be made of a single material (profile strips 17 in FIG. 15A) or can be multilayered (profile strip 17' in FIG. 15B with the layers 17a, 17b). The layers 17a, 17b can be chosen, for example, in a similar manner to that in WO-A1-02/100588.

In a first forming step, the profile strip 17 or 17' is bent in a first forming apparatus 20 by means of a first forming tool 19 (die) and a mold such that the later elevation 49 of the cam is formed. This forming step is analogous to the operation shown in FIG. 7. The profile strip 17, 17' which is bent in this way is now subjected in the same mold 18 in a second forming apparatus 42 to a second, additional forming step (FIG. 17, 19), in which a second forming tool 43 (stamp die) is pressed in a stamping action onto the inner side of the bent profile strip 17, 17'. As can be seen from the perspective representation of FIG. 18, the second forming tool 43 has on its top side an upwardly protruding head part 44, which is laterally adjoined by two lower-lying, circular-arc-shaped shoulders 47, 48. The radius of curvature of the shoulders 47, 48 is chosen such that it equates to the radius of the opening in a cam enclosing the shaft.

Figures 17, 18, 19:
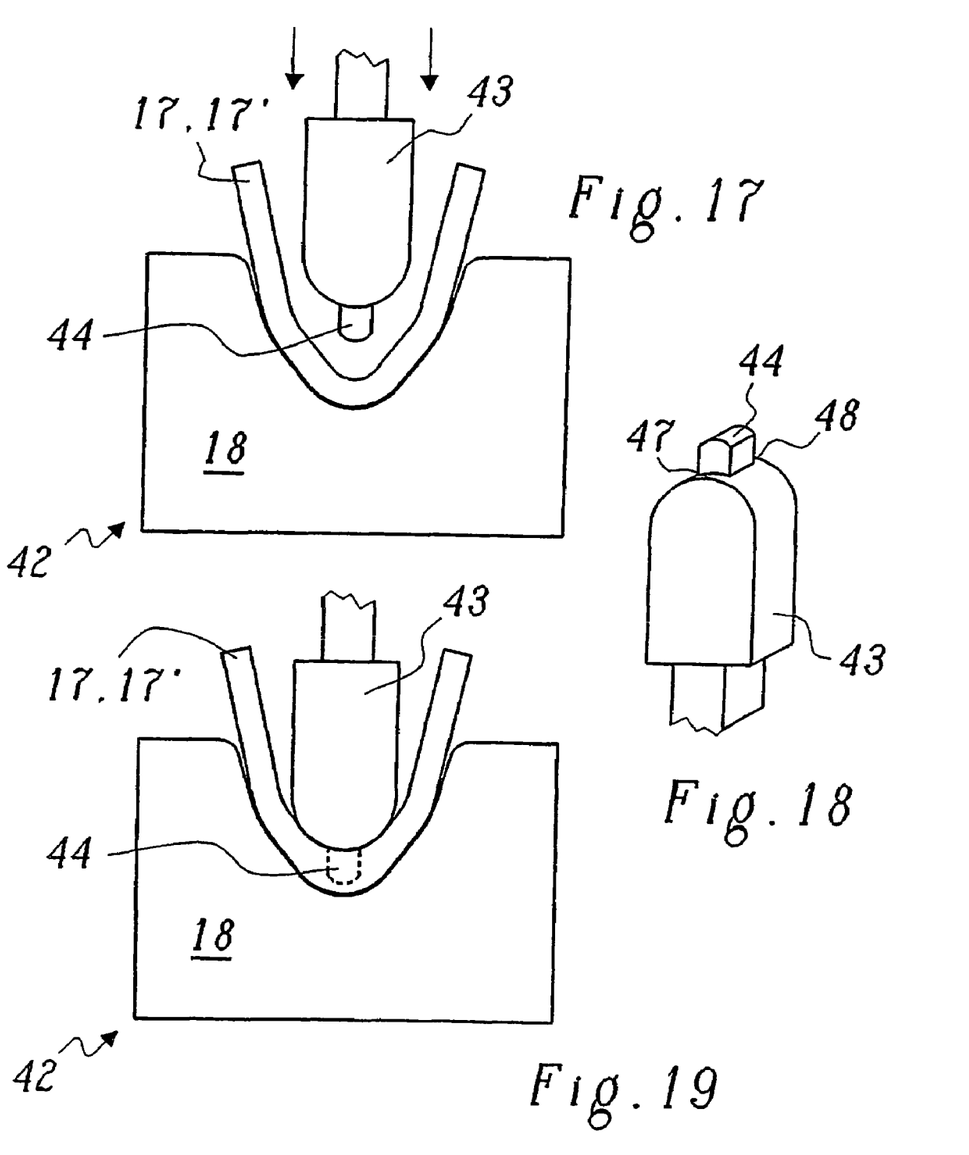
FIG. 17-19 show the innovative forming of the prestamped profile strip by means of a special forming tool (FIG. 18), which, in the inner region of the cam elevation, displaces material outward in the axial direction and thus fills the supplementary area on both sides.

By the head part 44 of the second forming tool 43, an indentation 45 (FIG. 20-22, 24) is now created, according to FIG. 19, in the region of the later elevation 49 of the cam. As a result of the indentation 45, cam material of volume V3—as can be seen from the cam cross section represented in FIG. 24 along the area X of the finished cam 46' shown in FIG. 22—is displaced outward and is there heaped up to form walls of volumes V1 and V2. In the radially inward direction, these walls are delimited in the forming process by the shoulders 47, 48 of the second forming tool 43. In this way, at the sides of the cam, the cavity 33 represented in FIG. 11 is closed. By virtue of the heaped walls, the cam is mechanically stabilized in the region of the elevation 49. At the same time, in the marginal regions of the cam, an angle of enclosure of a full 360° is achieved, which angle yields an advantageous improvement in the non-positive and positive connection between shaft and cam.

Figure 20:
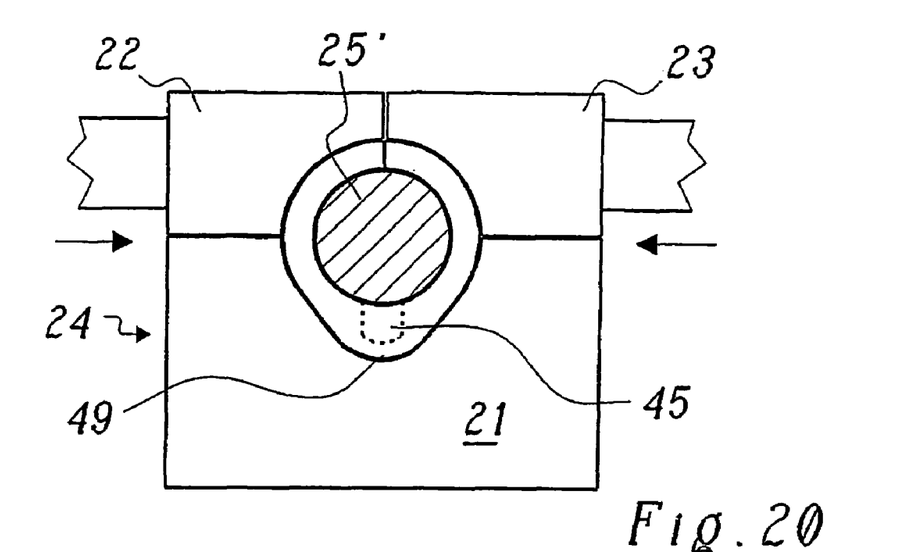
FIG. 20 shows the bending operation, analogous to FIG. 8, of the pre-stamped and formed profile strip.
Figure 21:
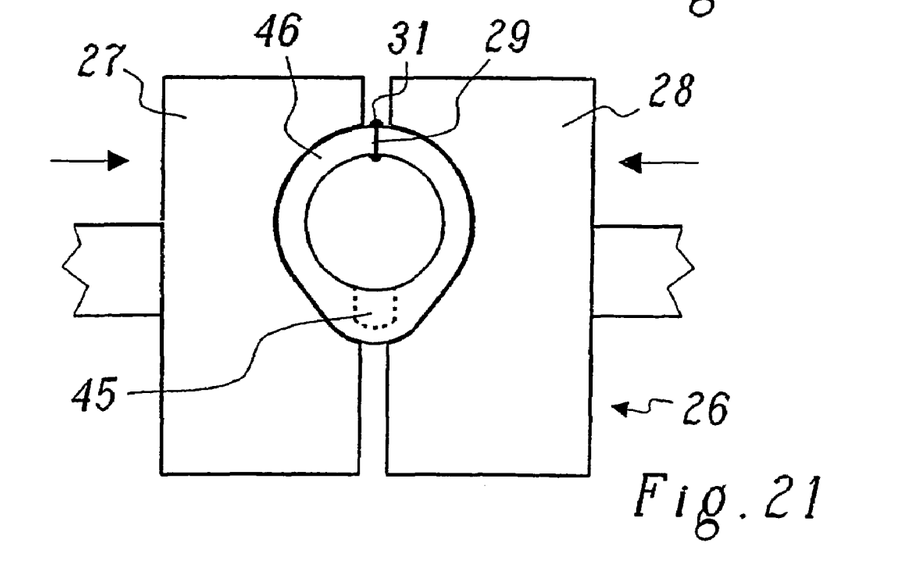
FIG. 21 shows the welding operation, analogous to FIG. 9, of the profile strip bent into the ring.
Figures 22, 23, 24:
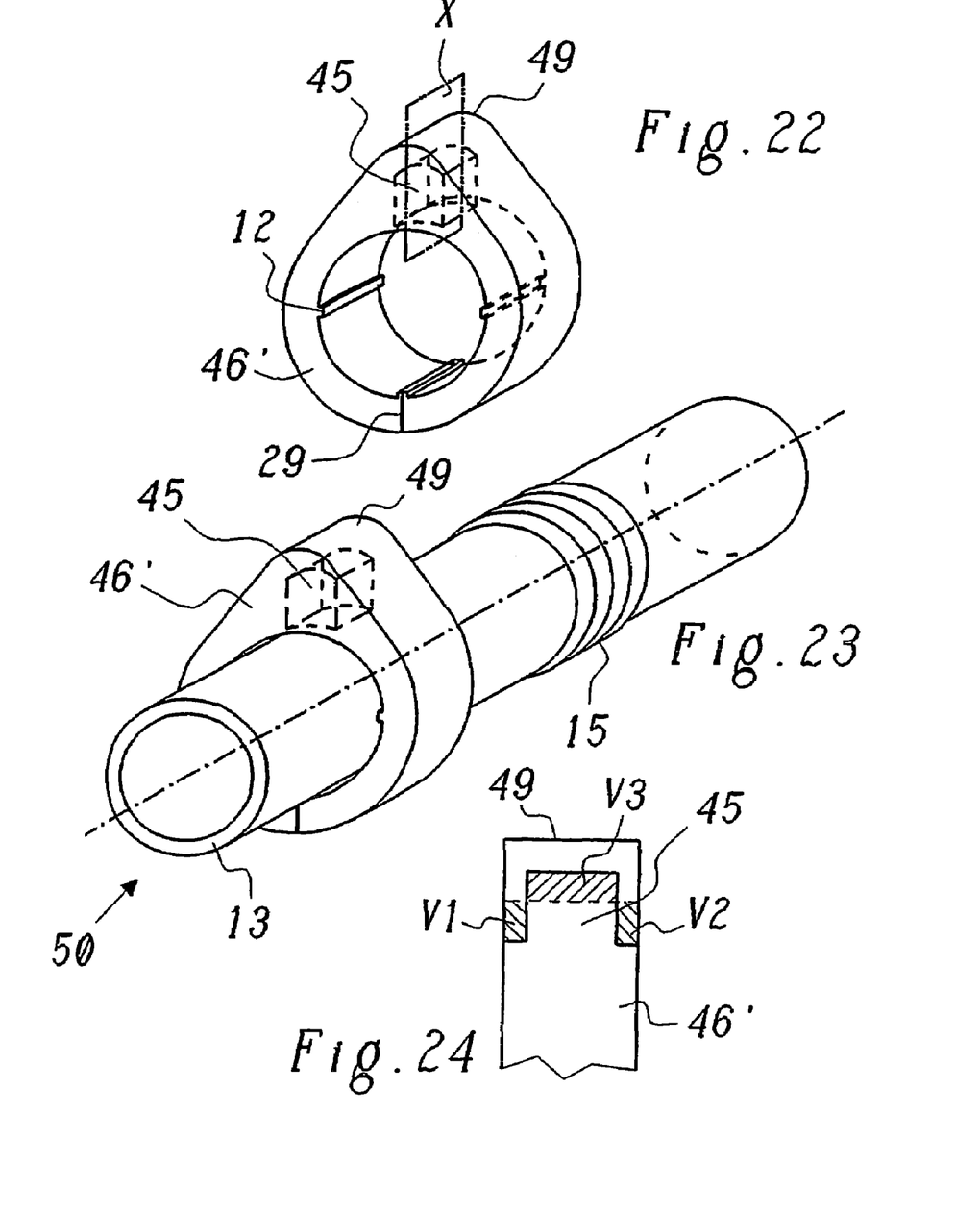
FIG. 22 shows, in a representation analogous to FIG. 1, a cam produced according to FIG. 15-21 with filled cavity.
FIG. 23 shows the sliding of the cam from FIG. 22 onto a shaft according to FIG. 2.
FIG. 24 shows, in a sectional representation, the volume ratios in the forming according to FIG. 17-19.

The profile strip formed in the second forming step and provided with the indentation 45 is bent in a third forming step according to FIG. 20, in a third forming apparatus 24, into a closed ring, the free ends of which butt one against the other with their end faces. This forming step is analogous to that shown in FIG. 8, with the difference that bending can now be effected around a mandrel 25' of circular cross section. Finally, the cam ring which has been closed in this way is welded, according to FIG. 21, analogously to FIG. 9, by resistance welding. This resulting cam 46 is distinguished by a circular opening, with which it can be slid onto a shaft. Of course, in a cam of this type, means for improving the positive connection, e.g. projections 12, can also again be incorporated on the inner side of the ring. This then results in a cam 46' according to FIG. 22, which then, according to FIG. 23, can be slid onto a shaft 13 to form a camshaft 50 and can be fastened by positive and/or non-positive connection.

The invention has previously been described with reference to illustrative embodiments in which the cams have been formed by bending and subsequent welding from a single, long profile strip. The cams can also, of course, be formed or assembled from a plurality of shorter profile strips, which are welded together one to another at the free ends.

REFERENCE SYMBOL LIST 10, 10' cam (sintered, forged)
11 opening
12 projection
13 shaft (in particular, tube)
14, 15 bead
16 camshaft
17, 17' profile strip
17a, 17b layer
18 mold
19 forming tool
20 forming apparatus
21 mounting
22, 23 forming tool
24 forming apparatus
25 mandrel
26 welding apparatus (resistance welding)
27, 28 electrodes (pressure die)
29 weld seam
30, 30' cam (bent, welded)
31 bead
32 rib
33 cavity
34, 34' profile strip
35 thickening
36, 36' cam (bent, welded)
37, 38 shoulder
39, 40, 41 recess
42 forming apparatus
43 forming tool
44 head part
45 indentation
46, 46' cam (bent, welded)
47, 48 shoulder
49 elevation
50 camshaft
51 axis
D thickness
UW angle of enclosure
V1, . . . V3 volume

The invention claimed is:

1. A method for producing a camshaft having a shaft with at least one annular cam, comprising:
producing one or more cams from one or more profile strips, respectively, each said strip having opposed free ends, by subjecting each said strip to a first forming step that provides a bent strip with an elevation, then subjecting said bent strip to a second forming step, wherein said second forming step provides the impression of an indentation and transports material outward in an axial direction in a region of the elevation of the cam and heaps up the material, and then subjecting said bent strip to a third forming step such that the finished cam has an annular form and can enclose the shaft with an angle of enclosure of 360°, and subsequently welding together the free ends;
sliding said at least one cam with an annular form onto the shaft; and
fastening said at least one cam on the shaft at a predefined location and in a predefined alignment, the cams being positively and/or non-positively connected to the shaft.

2. The method as claimed in claim 1, characterized in that the shaft is of tubular configuration.

3. The method as claimed in claim 1, characterized in that the shaft, in the sections in which the cams are placed, has an enlarged external diameter.

4. The method as claimed in claim 3, characterized in that, in the sections having the enlarged external diameter, circumferential beads are incorporated in the shaft.

5. The method as claimed in claim 3, further comprising forming on the inner side of the cam a ring for creating a positive connection to the shaft.

6. The method as claimed in claim 5, characterized in that the ring comprises projections or ribs which protrude radially inward.

7. The method as claimed in claim 1, characterized in that the free ends of the cams are welded together by means of resistance welding.

8. The method as claimed in claim 7, further comprising forming a recess in the region of a weld seam on an inner side, which recess receives a bead formed during the welding.

9. The method as claimed in claim 1, characterized in that the cams are produced in such a way from a profile strip of thickness which varies over the strip length that the cams enclose the shaft with an angle of enclosure which is greater than the angle of enclosure which is predefined by the cam profile if the strip thickness is constant, and in particular measures 360°.

10. The method as claimed in claim 9, characterized in that the process accommodates a profile strip having two shoulders disposed symmetrically to a center plane.

11. The method as claimed in claim 9, characterized in that the process accommodates a profile strip having in the middle a thickening.

12. The method as claimed in claim 1, characterized by producing the cams from a profile strip of constant thickness, and in that, on an inner side of a ring of the cam, an angle of enclosure is enlarged by a forming process.

13. The method as claimed in claim 1, characterized in that the cams are produced from a profile strip which has two layers of different material lying one above the other.

14. The method as claimed in claim 1, characterized in that the shaft is first enlarged in terms of the external diameter in a section which is earmarked for the seat of a cam, and in that the associated cam is subsequently slid onto this section of the shaft.

15. The method as claimed in claim 14, characterized in that, for the enlargement of the external diameter, circumferential beads are created on the shaft by a rolling operation.

16. The method as claimed in claim 1, characterized in that, for the production of the cams, a profile strip of varying thickness is used, such that the cams enclose the shaft with an angle of enclosure which is greater than the angle of enclosure which is predefined by the cam profile if the strip thickness is constant, and in particular measures 360°.

17. The method as claimed in claim 1, characterized in that, on the inner side of the ring of the cams means for creating a positive connection to the shaft are produced by a forming process, which means comprise, in particular, projections or ribs which protrude radially inward.

18. The method as claimed in claim 1, characterized in that the profile strips are created from a round wire by rolling.

19. The method as claimed in claim 1, further comprising:
using a forming tool having on its top side an upwardly protruding head part which is laterally joined by two lower-lining circular, arc-shaped shoulders, where a radius of the shoulders is chosen such that it equates to a radius of an opening in the cam enclosing the shaft.

* * * * *